I. Illofsky,
Steam Pump.
Nº 44,532. Patented Oct 4, 1864.
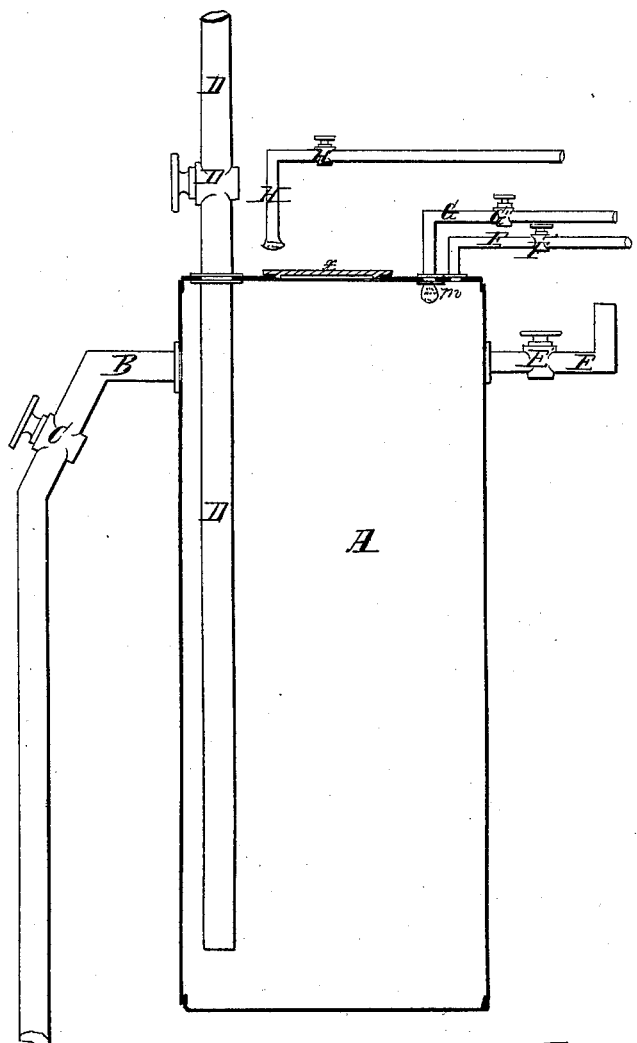
Witnesses,
Henry E. Roeder
J. Shank
Inventor.
Ignatz Illofsky

UNITED STATES PATENT OFFICE.

IGNATZ ILLOFSKY, OF PESTH, HUNGARY, ASSIGNOR TO HIMSELF, SIMON DONAN, PHILIP STERN, SALAMON NORDLINGER, AND JOSEPH STERN, ALL OF SAME PLACE.

IMPROVEMENT IN STEAM-PUMPS.

Specification forming part of Letters Patent No. 44,532, dated October 4, 1864.

*To all whom it may concern:*

Be it known that I, IGNATZ ILLOFSKY, of the city of Pesth, in Hungary, at present residing in New York, in the State of New York, have invented a new and Improved Steam-Pump; and I do hereby declare that the following is a full and exact description thereof, reference being had to the accompanying drawing, and to the letters of reference marked thereon.

The nature of my invention consists in the arrangement of a strong chamber or vessel provided with a large suction and delivery pipe, as well as with suitable steam, water, and air pipes, and so combined that by the production of a vacuum in said chamber any mass of ingredients mixed with water—such as brewers' mash, sirup, molasses, and similar fluid mixtures—will be drawn into said chamber and then forced out of the same again by the pressure of steam admitted for that purpose.

In the accompanying drawing, A represents a section of a strong vessel or boiler provided with a suitable man-hole, $x$, capable of being closed perfectly tight.

B is a suction-pipe attached to the vessel A and provided with a stop-cock, C.

D is the delivery-pipe, provided with a cock, D', and passing within a short distance of the bottom in the inside of the vessel A.

E is an air-pipe attached to the side of the vessel A, and provided with a stop-cock or valve, E'.

F is a steam-pipe and G is a water-pipe entering the vessel A at the top. The water-pipe G is provided at the inside of the vessel with a strainer, $m$.

H is a water-pipe capable of discharging water upon the top and outside of the vessel A through a perforated mouth-piece, $n$.

The operation is as follows: Steam being admitted through the pipe F into the vessel A, and then a stream of cold water made to enter said vessel A through the pipe G, a vacuum will thereby be formed in the inside of the vessel A. The cock C in the suction-pipe B is then opened, when the atmospheric pressure, acting upon the fluid substance or mass into which the end of the pipe B is placed, will force the same into said vessel A until the vessel is filled or the vacuum in the same is destroyed. The cock C is then closed and the cock F' in the steam-pipe F opened, as well as the cock D' in the discharge-pipe D, when the steam will enter the vessel A, press on the top of the fluid mass in said vessel, and thereby force the same up the discharge-pipe D, to be conducted to any desired place. The cock D' is then closed again, and the cock or valve E' in the air-pipe E is opened for a very short time, after which the cocks G' and H' are opened, whereby the steam in the vessel A will be again condensed and a vacuum formed in the inside of said vessel, when the above-described operation can be repeated. By this arrangement any fluid mixture—such as brewers' mash, molasses, sirup, powdered or crushed substances—are mixed with water, and similar mixtures which with difficulty are pumped by the usual mechanical pumps, where the mixture has to pass through a series of valves, can by this steam and vacuum pump be forced up any distance corresponding to the pressure of the steam used.

What I claim as my invention, and desire to secure by Letters Patent, is—

The arrangement of the vessel A, provided with pipes B, D, E, F, G, and H, when combined in the manner and for the purpose substantially as specified.

IGNATZ ILLOFSKY.

Witnesses:
   HENRY E. ROEDER,
   I. STRAUSS.